(12) United States Patent
Okubo et al.

(10) Patent No.: US 7,467,041 B2
(45) Date of Patent: Dec. 16, 2008

(54) WORKLOAD CALCULATION APPARATUS AND METHOD FOR INTERNAL COMBUSTION ENGINE, AND ENGINE CONTROL UNIT

(75) Inventors: Katsura Okubo, Wako (JP); Yuji Yasui, Wako (JP); Masahiro Sato, Wako (JP); Koichiro Shinozaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/790,257

(22) Filed: Apr. 24, 2007

(65) Prior Publication Data
US 2007/0250249 A1    Oct. 25, 2007

(30) Foreign Application Priority Data
Apr. 24, 2006   (JP) .............................. 2006-119597

(51) Int. Cl.
*G06F 19/00*   (2006.01)
*F02B 75/04*   (2006.01)
*G06G 7/70*    (2006.01)

(52) U.S. Cl. ...................... 701/103; 701/115; 123/78 E; 123/435

(58) Field of Classification Search ................. 701/101, 701/102, 103, 115; 123/78 E, 435
See application file for complete search history.

(56) References Cited

U.S. PATENT DOCUMENTS 4,715,339 A * 12/1987 Sagawa et al. ............... 123/357
5,715,794 A *  2/1998 Nakamura et al. ........... 123/305

(Continued)

FOREIGN PATENT DOCUMENTS

EP    1 626 263 A2    2/2006

(Continued)

OTHER PUBLICATIONS

European Search Report with English language translation, Jul. 11, 2008, a total of 8 pages.

(Continued)

*Primary Examiner*—Willis R. Wolfe, Jr.
*Assistant Examiner*—Johnny H. Hoang
(74) *Attorney, Agent, or Firm*—Squire, Sanders & Dempsey L.L.P.

(57) ABSTRACT

A workload calculation apparatus and method for an internal combustion engine, and an engine control unit are provided for accurately calculating a workload parameter indicative of the workload of the internal combustion engine. The workload calculation apparatus of the internal combustion engine ignition, which calculates the workload parameter indicative of the workload of the internal combustion engine, sets a first correlation function indicative of an integral of the product of volume data indicating a change state of the volume of the combustion chamber and a reference signal having a predetermined frequency k; generates the reference signal; detects in-cylinder pressure change amount data indicative of the amount of change in the pressure in the combustion chamber; calculates, on the basis of the generated reference signal and the detected in-cylinder pressure change amount data, a second correlation function indicative of an integral of the product of the reference signal and the in-cylinder pressure change amount data; and calculates the workload parameter on the basis of the first and second correlation functions.

39 Claims, 7 Drawing Sheets

U.S. PATENT DOCUMENTS

| | | | |
|---|---|---|---|
| 6,915,788 B2 * | 7/2005 | Nakamura | 123/488 |
| 7,233,856 B2 * | 6/2007 | Yuya et al. | 701/112 |
| 7,317,983 B2 * | 1/2008 | Ishizuka et al. | 701/103 |

FOREIGN PATENT DOCUMENTS

| JP | 2005-146854 | 6/2005 |
|---|---|---|
| WO | 2006/035842 A1 | 4/2006 |

OTHER PUBLICATIONS

Nagashima et al., "New Indicated Mean Effective Pressure Measuring Method and Its Applications", Jan. 1, 2002, JSAE Review, Society of Automotive Engineers of Japan, vol. III, No. 3, pp. 2982-2987.

* cited by examiner

F I G. 8

| $Cr = Cr\_L$ | $V_{a1} = VREF1$, $V_{b1} = VREF2$ |
|---|---|
| $Cr = Cr1$ | $V_{a1} = VREF3$, $V_{b1} = VREF5$ <br> $V_{a2} = VREF4$, $V_{b2} = VREF6$ |
| $Cr = Cr\_H$ | $V_{a1} = VREF7$, $V_{b1} = VREF9$ <br> $V_{a2} = VREF8$, $V_{b2} = VREF10$ | ized.

WORKLOAD CALCULATION APPARATUS AND METHOD FOR INTERNAL COMBUSTION ENGINE, AND ENGINE CONTROL UNIT

BACKGROUND OF THE INVENTION

1. Field of the Invention

The present invention relates to a workload calculation apparatus and method for an internal combustion engine and an engine control unit for calculating a workload parameter indicative of the workload of the internal combustion engine.

2. Description of the Prior Art

Conventionally, as this type of workload calculation apparatus, one described, for example, in Laid-open Japanese Patent Application No. 2006-52647 is known. This workload calculation apparatus calculates an indicated mean effective pressure of the internal combustion engine as follows. A piezoelectric-element-type in-cylinder pressure sensor, which is attached to an ignition plug, detects an in-cylinder pressure in a combustion chamber of the internal combustion engine. Then, the output of the in-cylinder pressure sensor and the volume data on the rate of change in volume of the combustion chamber are developed in Fourier series to calculate the Fourier coefficients. Based on the Fourier coefficients thus calculated, an indicated mean effective pressure of the internal combustion engine is calculated.

In general, an in-cylinder pressure sensor outputs, not the in-cylinder pressure itself, but a detection signal indicative of the amount of change in the in-cylinder pressure. Therefore, when this type of in-cylinder pressure sensor is used to calculate an indicated mean effective pressure as described above, the output of the in-cylinder pressure sensor must be integrated by, for example, a charge amplifier to obtain data on the in-cylinder pressure, and then the indicated mean effective pressure must be calculated based on the Fourier coefficient of the in-cylinder pressure data thus obtained. In this case, however, since the aforementioned type of in-cylinder pressure sensor has the characteristics of changing its output in accordance with temperature, the changes of the output in accordance with temperature accumulate as a result of the integral, leading to a great drift in the in-cylinder pressure data. As a result, the indicated mean effective pressure cannot possibly be calculated accurately.

The charge amplifier used may have the function of resetting the integral value at a predetermined timing during one combustion cycle of the internal combustion engine. However, in this case, because the integral is performed from combustion cycle to combustion cycle, the drift in the in-cylinder pressure data is not eliminated, thus also making an accurate calculation of the indicated mean effective pressure impossible. Also, a contiguous sequence of in-cylinder pressure data is inevitably interrupted before and after the process of resetting the integral value. As a result, the proper frequency characteristics of the in-cylinder pressure data cannot be obtained. Because of this, an appropriate Fourier coefficient cannot be evaluated, which in turn causes a reduction in accuracy of the indicated mean effective pressure.

Further, as an in-cylinder pressure detection apparatus for compensating for the aforementioned drift in the in-cylinder pressure data (hereinafter referred to as "in-cylinder pressure drift"), one known one is the one disclosed, for example, in Laid-open Japanese Patent Application No. 2005-256775 and Laid-open Japanese Patent Application No. 2005-315208. In these in-cylinder pressure detection apparatuses, the in-cylinder pressure drift in a current combustion cycle is calculated and then the in-cylinder pressure data in the next combustion cycle is corrected on the basis of the in-cylinder pressure drift thus calculated to compensate for the in-cylinder pressure drift. However, since these in-cylinder pressure detection apparatuses correct the in-cylinder pressure data in the next combustion cycle on the basis of the in-cylinder pressure drift in a current combustion cycle, these detection apparatuses are not capable of adequately compensating for the in-cylinder pressure drift in a transition period in which the in-cylinder pressure peak value greatly varies from combustion cycle to combustion cycle. In consequence, due to the use of the in-cylinder pressure data thus obtained, the indicated mean effective pressure cannot be calculated accurately.

SUMMARY OF THE INVENTION

The present invention has been made to solve the problems as mentioned above, and it is an object of the invention to provide a workload calculation apparatus and method for an internal combustion engine, and an engine control unit, which are capable of calculating a workload parameter indicative of the workload of the internal combustion engine.

To achieve the above object, according to a first aspect of the present invention, there is provided a workload calculation apparatus for an internal combustion engine calculating a workload parameter indicative of a workload of the internal combustion engine having a combustion chamber, which is characterized by comprising first correlation function setting means for setting a first correlation function indicative of an integral of the product of volume data indicating a change state of a volume of the combustion chamber and a reference signal having a predetermined frequency; reference signal generating means for generating the reference signal; in-cylinder pressure change amount data detecting means for detecting in-cylinder pressure change amount data indicative of the amount of change in pressure in the combustion chamber; second correlation function calculating means for calculating, on the basis of the generated reference signal and the detected in-cylinder pressure change amount data, a second correlation function indicative of an integral of the product of the reference signal and the in-cylinder pressure change amount data; and workload parameter calculating means for calculating the workload parameter on the basis of the first and second correlation functions.

According to this workload calculation apparatus for an internal combustion engine, the first correlation function indicative of an integral of the product of the reference signal having a predetermined frequency and the volume data indicating the state of a change in the volume of the combustion chamber is set by the first correlation function setting means. The reference signal is generated by the reference signal generating means, and also the in-cylinder pressure change amount data indicative of the amount of change in the pressure in the combustion chamber is detected by the in-cylinder pressure change amount data detecting means, and then, based on the reference signal and the in-cylinder pressure change amount data, the second correlation function indicative of an integral of the products of the reference signal and the in-cylinder pressure change amount data is calculated by the second correlation function calculating means. In turn, based on the first and second correlation functions thus evaluated, the workload parameter is calculated by the workload parameter calculating means.

As described above, for the calculation of the second correlation function, the in-cylinder pressure change amount data indicative of the amount of change in the pressure of the combustion chamber is used directly without being integrated. For this reason, unlike conventional calculations, even in a transition period in which the peak value of the pressure of the combustion chamber varies from combustion cycle to combustion cycle, the second correlation function is correctly calculated without incurring a reduction in calculation accuracy caused by the integral operation of the in-cylinder pressure change amount data. As a result, the accurate calculation of the workload parameter is achieved. Also, because the in-cylinder pressure change amount data is not integrated, the operation load for the workload parameter is reduced.

To achieve the above object, according to a second aspect of the present invention, there is provided a workload calculation method for an internal combustion engine for calculating a workload parameter indicative of a workload of the internal combustion engine having a combustion chamber, comprising the steps of setting a first correlation function indicative of an integral of the product of volume data indicating a change state of a volume of the combustion chamber and a reference signal having a predetermined frequency; generating the reference signal; detecting in-cylinder pressure change amount data indicative of the amount of change in pressure in the combustion chamber; calculating, on the basis of the generated reference signal and the detected in-cylinder pressure change amount data, a second correlation function indicative of an integral of the product of the reference signal and the in-cylinder pressure change amount data; and calculating the workload parameter on the basis of the first and second correlation functions.

This workload calculation method provides the same advantageous effects as described above concerning the workload calculation apparatus according to the first aspect of the present invention.

To achieve the above object, according to a third aspect of the present invention, there is provided an engine control unit including a control program for controlling calculation of a workload parameter indicative of a workload of an internal combustion engine having a combustion chamber, the program causing a computer to set a first correlation function indicative of an integral of the product of volume data indicating a change state of a volume of the combustion chamber and a reference signal having a predetermined frequency; generate the reference signal; detect in-cylinder pressure change amount data indicative of the amount of change in pressure in the combustion chamber; calculate, on the basis of the generated reference signal and the detected in-cylinder pressure change amount data, a second correlation function indicative of an integral of the product of the reference signal and the in-cylinder pressure change amount data; and calculate the workload parameter on the basis of the first and second correlation functions.

This engine control unit provides the same advantageous effects as described above concerning the workload calculation apparatus according to the first aspect of the present invention.

Preferably, in the workload calculation apparatus for an internal combustion engine described above, the in-cylinder pressure change amount data detecting means is an in-cylinder pressure sensor detecting the amount of change in pressure in the combustion chamber.

According to this preferred embodiment of the workload calculation apparatus for an internal combustion engine, because an in-cylinder pressure sensor of a typically type for detecting the amount of change in the pressure in the combustion chamber is used as the in-cylinder pressure change amount data detecting means, when an in-cylinder pressure sensor of such a type is provided from the first, an additional component for calculating the workload parameter is not required, thus avoiding an increase in cost of the workload calculation apparatus.

Preferably, in the workload calculation method for an internal combustion engine described above, the step of detecting in-cylinder pressure change amount data uses an in-cylinder pressure sensor detecting the amount of change in pressure in the combustion chamber.

This preferred embodiment of the workload calculation method provides the same advantageous effects as described above concerning the workload calculation apparatus according to the first aspect of the present invention.

Preferably, in the engine control unit described above, the control program further causes the computer to detect the in-cylinder pressure change amount data by use of an in-cylinder pressure sensor detecting the amount of change in pressure in the combustion chamber.

This preferred embodiment of the engine control unit provides the same advantageous effects as described above concerning the workload calculation apparatus according to the first aspect of the present invention.

Preferably, in the workload calculation apparatus for an internal combustion engine described above, the workload parameter includes an indicated mean effective pressure of the internal combustion engine.

According to this preferred embodiment of the workload calculation apparatus for an internal combustion engine, because the indicated mean effective pressure is calculated as the workload parameter, this makes it possible to use the indicated mean effective pressure thus accurately calculated to correctly perform engine control and the like.

Preferably, in the workload calculation method for an internal combustion engine described above, the workload parameter includes an indicated mean effective pressure of the internal combustion engine.

This preferred embodiment of the workload calculation method provides the same advantageous effects as described above concerning the workload calculation apparatus according to the first aspect of the present invention.

Preferably, in the engine control unit described above, the control program further causes the computer to use, as part of the workload parameter, an indicated mean effective pressure of the internal combustion engine.

This preferred embodiment of the engine control unit provides the same advantageous effects as described above concerning the workload calculation apparatus according to the first aspect of the present invention.

Preferably, in the workload calculation apparatus for an internal combustion engine described above, the predetermined frequency of the reference signal and the number of predetermined frequencies of the reference signal are set in accordance with the volume data.

According to this preferred embodiment of the workload calculation apparatus for an internal combustion engine, a predetermined frequency of the reference signal and the number of predetermined frequencies thereof are set in accordance with the volume data. As a result, for example, when the predetermined frequency of the reference signal and the number of predetermined frequencies thereof are set so as to come into agreement with a frequency and the number of frequencies of the frequency component satisfactorily indicative of the state of change in the volume of the combustion chamber from among the volume data (hereinafter called the "optimum frequency"), the first correlation function is correctly set, thereby further accurately calculating the workload parameter. Also, by the agreement between the number of predetermined frequencies and the number of optimum frequencies, the number of first correlation functions set is minimized, resulting in a further reduction in load of the calculation of the workload parameter.

The change state of the volume of the combustion chamber is satisfactorily expressed by a lower-order component with reference to the rotational speed of the internal combustion engine. For this reason, when the predetermined frequency is set as described above, if a relatively low sampling frequency is set for the in-cylinder pressure change amount data and/or the volume data, the first and/or second correlation functions can be correctly set, thus ensuring the accuracy of the calculation of the workload parameter. In consequence, the setting of a low sampling frequency for the in-cylinder pressure change amount data and/or the volume data is made implementable, resulting in a further reduction in load of the calculation of the workload parameter.

Preferably, in the workload calculation method for an internal combustion engine described above, the predetermined frequency of the reference signal and the number of predetermined frequencies of the reference signal are set in accordance with the volume data.

This preferred embodiment of the workload calculation method provides the same advantageous effects as described above concerning the workload calculation apparatus according to the first aspect of the present invention.

Preferably, in the engine control unit described above, the control program further causes the computer to set the predetermined frequency of the reference signal and the number of predetermined frequencies of the reference signal in accordance with the volume data.

This preferred embodiment of the engine control unit provides the same advantageous effects as described above concerning the workload calculation apparatus according to the first aspect of the present invention.

Preferably, the workload calculation apparatus for an internal combustion engine described above further comprises volume data generating means for generating the volume data, in which the first correlation function setting means sets the first correlation function on the basis of the generated reference signal and the volume data.

According to this preferred embodiment of the workload calculation apparatus for an internal combustion engine, the volume data is generated by the volume data generating means and the first correlation function is set based on the generated volume data and the reference signal. Thereby, the first correlation function is set to an appropriate value reflecting the actual volume data, resulting in a further accurate calculation of the workload parameter.

Preferably, the workload calculation method for an internal combustion engine described above comprises the step of volume data generating means for generating the volume data, in which the step of setting a first correlation function includes setting the first correlation function on the basis of the generated reference signal and the volume data.

This preferable embodiment of the workload calculation method provides the same advantageous effects as described above concerning the workload calculation apparatus according to the first aspect of the present invention.

Preferably, in the engine control unit described above, the control program further causes the computer to generate the volume data; and to set the first correlation function on the basis of the generated reference signal and the volume data.

This preferable embodiment of the engine control unit provides the same advantageous effects as described above concerning the workload calculation apparatus according to the first aspect of the present invention.

Preferably, the workload calculation apparatus for an internal combustion engine described above further comprises angle position detecting means for detecting an angle position of a crankshaft of the internal combustion engine, in which the volume data generating means generates the volume data on the basis of the detected crankshaft angle position, and the reference signal generating means generates the reference signal on the basis of the detected crankshaft angle position.

The pressure in the combustion chamber and the volume of the combustion chamber periodically varies with the rotation of the crankshaft of the internal combustion engine. According to the present invention, because the volume data and the reference signal are generated based on the detected angle position of the crankshaft of the internal combustion engine, the volume data and the reference signal are correctly synchronized in phase with each other, and the in-cylinder pressure data and the reference signal are correctly synchronized in phase with each other. As a result, the first and second correlation functions are correctly calculated, leading to a further accurate calculation of the workload parameter.

Preferably, the workload calculation method for an internal combustion engine described above further comprises the step of detecting an angle position of a crankshaft of the internal combustion engine, in which the step of generating volume data includes generating the volume data on the basis of the detected crankshaft angle position, and the step of generating a reference signal includes generating the reference signal on the basis of the detected crankshaft angle position.

This preferred embodiment of the workload calculation method provides the same advantageous effects as described above concerning the workload calculation apparatus according to the first aspect of the present invention.

Preferably, in the engine control unit described above, the control program further causes the computer to detect an angle position of a crankshaft of the internal combustion engine; to generate the volume data on the basis of the detected crankshaft angle position; and to generate the reference signal on the basis of the detected crankshaft angle position.

This preferred embodiment of the engine control unit provides the same advantageous effects as described above concerning the workload calculation apparatus according to the first aspect of the present invention.

Preferably, in the workload calculation apparatus for an internal combustion engine described above, the first correlation function setting means sets, as the first correlation function, a Fourier coefficient evaluated by developing the volume data in Fourier series, and the second correlation function calculating means calculates, as the second correlation function, a Fourier coefficient evaluated by developing the in-cylinder pressure change amount data in Fourier series.

According to this preferred embodiment of the workload calculation apparatus for an internal combustion engine, because the first and second correlation functions are calculated by the use of Fourier series expansion, in particular, the use of a fast frequency decomposition technique such as fast Fourier transform makes it possible to further reduce the load of the calculation of the workload parameter.

Preferably, in the workload calculation method for an internal combustion engine described above, the step of setting a first correlation function includes setting, as the first correlation function, a Fourier coefficient evaluated by developing the volume data in Fourier series, and the step of calculating a second correlation function includes calculating, as the second correlation function, a Fourier coefficient evaluated by developing the in-cylinder pressure change amount data in Fourier series.

This preferred embodiment of the workload calculation method provides the same advantageous effects as described above concerning the workload calculation apparatus according to the first aspect of the present invention.

Preferably, in the engine control unit described above, the control program further causes the computer to set, as the first correlation function, a Fourier coefficient evaluated by developing the volume data in Fourier series; and to calculate, as the second correlation function, a Fourier coefficient evaluated by developing the in-cylinder pressure change amount data in Fourier series.

This preferred embodiment of the engine control unit provides the same advantageous effects as described above concerning the workload calculation apparatus according to the first aspect of the present invention.

Preferably, in the workload calculation apparatus for an internal combustion engine described above, the internal combustion engine comprises a variable mechanism that changes at least either a compression ratio or a displacement of the internal combustion engine. The workload calculation apparatus further comprises parameter detecting means for detecting a parameter indicative of at least either the compression ratio or the displacement, in which the volume data generating means generates the volume data in accordance with the detected parameter.

When the compression ratio and/or the displacement of the internal combustion engine change, in response to this change, the volume data indicating of the change state of the volume of the combustion chamber change. According to the present invention, because the volume data is generated in accordance with the parameter indicative of the compression ratio and/or the displacement, the first correlation function can be appropriately set in accordance with the compression ratio and/or the displacement. As a result, the workload parameter is accurately calculated.

Preferably, in the workload calculation method for an internal combustion engine described above, the internal combustion engine comprises a variable mechanism that changes at least either a compression ratio or a displacement of the internal combustion engine. The workload calculation method for an internal combustion engine further comprises the step of detecting a parameter indicative of at least either the compression ratio or the displacement, in which the step of generating volume data includes generating the volume data in accordance with the detected parameter.

This preferred embodiment of the workload calculation method provides the same advantageous effects as described above concerning the workload calculation apparatus according to the first aspect of the present invention.

Preferably, in the engine control unit described above, the internal combustion engine comprising a variable mechanism that changes at least either a compression ratio or a displacement of the internal combustion engine, and the control program further causes the computer to detect a parameter indicative of at least either the compression ratio or the displacement; and to generate the volume data in accordance with the detected parameter.

This preferred embodiment of the engine control unit provides the same advantageous effects as described above concerning the workload calculation apparatus according to the first aspect of the present invention.

Preferably, in the workload calculation apparatus for an internal combustion engine described above, the internal combustion engine comprises a variable mechanism that changes at least either a compression ratio or a displacement of the internal combustion engine. The workload calculation apparatus for an internal combustion engine further comprises parameter detecting means for detecting a parameter indicative of at least either the compression ratio or the displacement, in which the reference signal generating means sets the predetermined frequency of the reference signal and the number of predetermined frequencies of the reference signal in accordance with the parameter.

As described earlier, since the volume data varies in accordance with the compression ratio and/or the displacement, the frequency and the number of frequencies of the frequency component satisfactorily indicating the change state of the volume of the combustion chamber in the volume data also vary in accordance with the compression ratio and/or the displacement. According to the present invention, the frequency of the reference signal used for setting the first correlation function is set in accordance with the parameter indicative of the detected compression and/or displacement. As a result, the first correlation function can be appropriately set in accordance with the actual compression ratio and/or displacement such that the state of the change in the volume of the combustion chamber is satisfactorily reflected, and the workload parameter can be accurately calculated. Also, because the number of frequencies of the reference signals is set in accordance with the parameter, the number of first correlation functions set is minimized in accordance with the compression ratio and/or the displacement, resulting in a further reduction in the load of the calculation of the workload parameter.

Preferably, in the workload calculation method for an internal combustion engine described above, the internal combustion engine comprises a variable mechanism that changes at least either a compression ratio or a displacement of the internal combustion engine. The workload calculation method further comprises the step of detecting a parameter indicative of at least either the compression ratio or the displacement, in which the step of generating a reference signal includes setting the predetermined frequency of the reference signal and the number of predetermined frequencies of the reference signal in accordance with the parameter.

This preferred embodiment of the workload calculation method provides the same advantageous effects as described above concerning the workload calculation apparatus according to the first aspect of the present invention.

Preferably, in the engine control unit described above, the internal combustion engine comprising a variable mechanism that changes at least either a compression ratio or a displacement of the internal combustion engine. The control program further causes the computer to detect a parameter indicative of at least either the compression ratio or the displacement; and to set the predetermined frequency of the reference signal and the number of predetermined frequencies of the reference signal in accordance with the parameter.

This preferred embodiment of the engine control unit provides the same advantageous effects as described above concerning the workload calculation apparatus according to the first aspect of the present invention.

Preferably, in the workload calculation apparatus for an internal combustion engine described above, the first correlation function setting means sets the first correlation function to a predetermined value.

According to this preferred embodiment of the workload calculation apparatus for an internal combustion engine, the first correlation function is set to the predetermined value. Typically, the maximum value, the minimum value and the intermediate values of the volume of the combustion chamber change approximately regularly. For this reason, when the first correlation function which is the function of the correlation between the volume data and the reference signal is set to the predetermined value based on these maximum, minimum and intermediate values, the accuracy of the calculation of the workload parameter can be ensured. In addition, the omission of calculation of the first correlation function based on the generated reference signal and the volume data makes it possible to further reduce the load of the calculation of the workload parameter.

Preferably, in the workload calculation method for an internal combustion engine described above, the step of setting a first correlation function includes setting the first correlation function to a predetermined value.

This preferred embodiment of the workload calculation method provides the same advantageous effects as described above concerning the workload calculation apparatus according to the first aspect of the present invention.

Preferably, in the engine control unit described above, the control program further causes the computer to set the first correlation function to a predetermined value.

This preferred embodiment of the engine control unit provides the same advantageous effects as described above concerning the workload calculation apparatus according to the first aspect of the present invention.

Preferably, the workload calculation apparatus for an internal combustion engine described above further comprises angle position detecting means for detecting an angle position of a crankshaft of the internal combustion engine, in which the reference signal generating means generates the reference signal on the basis of the angle position of the crankshaft.

As described earlier, the pressure in the combustion chamber periodically varies with the rotation of the crankshaft of the internal combustion engine. By generating the reference signal based on the detected angle position of the crankshaft as described above, the in-cylinder pressure data and the reference signal can be correctly synchronized in phase with each other. As a result, the second correlation function is further correctly calculated, leading to a further accurate calculation of the workload parameter.

Preferably, the workload calculation method for an internal combustion engine described above further comprises the steps of detecting an angle position of a crankshaft of the internal combustion engine, in which the step of generating a reference signal includes generating the reference signal on the basis of the angle position of the crankshaft.

This preferred embodiment of the workload calculation method provides the same advantageous effects as described above concerning the workload calculation apparatus according to the first aspect of the present invention.

Preferably, in the engine control unit described above, the control program further causes the computer to detect an angle position of a crankshaft of the internal combustion engine; and to generate the reference signal on the basis of the angle position of the crankshaft.

This preferred embodiment of the engine control unit provides the same advantageous effects as described above concerning the workload calculation apparatus according to the first aspect of the present invention.

Preferably, in the workload calculation apparatus for an internal combustion engine described above, the second correlation function calculating means calculates, as the second correlation function, a Fourier coefficient evaluated by developing the in-cylinder pressure change amount data in Fourier series.

According to this preferred embodiment of the workload calculation apparatus for an internal combustion engine, because the second correlation function is calculated by the use of Fourier series expansion, in particular, the use of a fast frequency decomposition technique such as fast Fourier transform makes it possible to further reduce the load of the calculation of the workload parameter.

Preferably, in the workload calculation method for an internal combustion engine described above, the step of calculating a second correlation function includes calculating, as the second correlation function, a Fourier coefficient evaluated by developing the in-cylinder pressure change amount data in Fourier series.

This preferred embodiment of the workload calculation method provides the same advantageous effects as described above concerning the workload calculation apparatus according to the first aspect of the present invention.

Preferably, in the engine control unit described above, the control program further causes the computer to calculate, as the second correlation function, a Fourier coefficient evaluated by developing the in-cylinder pressure change amount data in Fourier series.

This preferred embodiment of the engine control unit provides the same advantageous effects as described above concerning the workload calculation apparatus according to the first aspect of the present invention.

Preferably, in the workload calculation apparatus for an internal combustion engine described above, the internal combustion engine comprises a variable compression ratio mechanism that changes at least either a compression ratio or a displacement of the internal combustion engine. The workload calculation apparatus further comprises parameter detecting means for detecting a parameter indicative of at least either the compression ratio or the displacement, in which the first correlation function setting means comprises storing means for storing a predetermined first correlation function value according to the compression ratio parameter as the predetermined value, and the first correlation function setting means reads the first correlation function value according to the detected parameter to set the first correlation function.

As described earlier, the frequency and the number of frequencies of the frequency component satisfactorily indicating the change state of the volume of the combustion chamber in the volume data vary in accordance with the compression ratio and/or the displacement of the internal combustion engine. For this reason, the value of the first correlation function and the number of first correlation functions satisfactorily reflecting the change state of the volume of the combustion chamber also vary in accordance with the compression ratio and/or the displacement. According to the present invention, the predetermined first correlation function value is read in accordance with the parameter indicative of the detected compression and/or displacement, in order to set the first correlation function which is a function of the correlation between the volume data and the reference signal. As a result, the first correlation function can be appropriately set in accordance with the actual compression ratio and/or displacement, resulting in an accurate calculation of the workload parameter. For the same reason, the number of first correlation functions set is minimized in accordance with the compression ratio and/or the displacement, resulting in a further reduction in the load of the calculation of the workload parameter.

Preferably, in the workload calculation method for an internal combustion engine described above, the internal combustion engine comprises a variable compression ratio mechanism that changes at least either a compression ratio or a displacement of the internal combustion engine. The workload calculation method for an internal combustion engine further comprises the step of detecting a parameter indicative of at least either the compression ratio or the displacement, in which the step of setting a first correlation function includes storing a predetermined first correlation function value according to the compression ratio parameter as the predetermined value, and the step of setting a first correlation function includes reading the first correlation function value according to the detected parameter to set the first correlation function.

This preferred embodiment of the workload calculation method provides the same advantageous effects as described above concerning the workload calculation apparatus according to the first aspect of the present invention.

Preferably, in the engine control unit described above, the internal combustion engine comprising a variable compression ratio mechanism that changes at least either a compression ratio or a displacement of the internal combustion engine, and the control program further causes the computer to detect a parameter indicative of at least either the compression ratio or the displacement; to store a predetermined first correlation function value according to the compression ratio parameter as the predetermined value; and to read the first correlation function value according to the detected parameter to set the first correlation function.

This preferred embodiment of the engine control unit provides the same advantageous effects as described above concerning the workload calculation apparatus according to the first aspect of the present invention.

BRIEF DESCRIPTION OF THE DRAWINGS

FIG. 8 is an example of a map used for setting volumetric change rate Fourier coefficients $V_{ak}$, $V_{bk}$.

DETAILED DESCRIPTION OF THE EMBODIMENT

Figure 1:
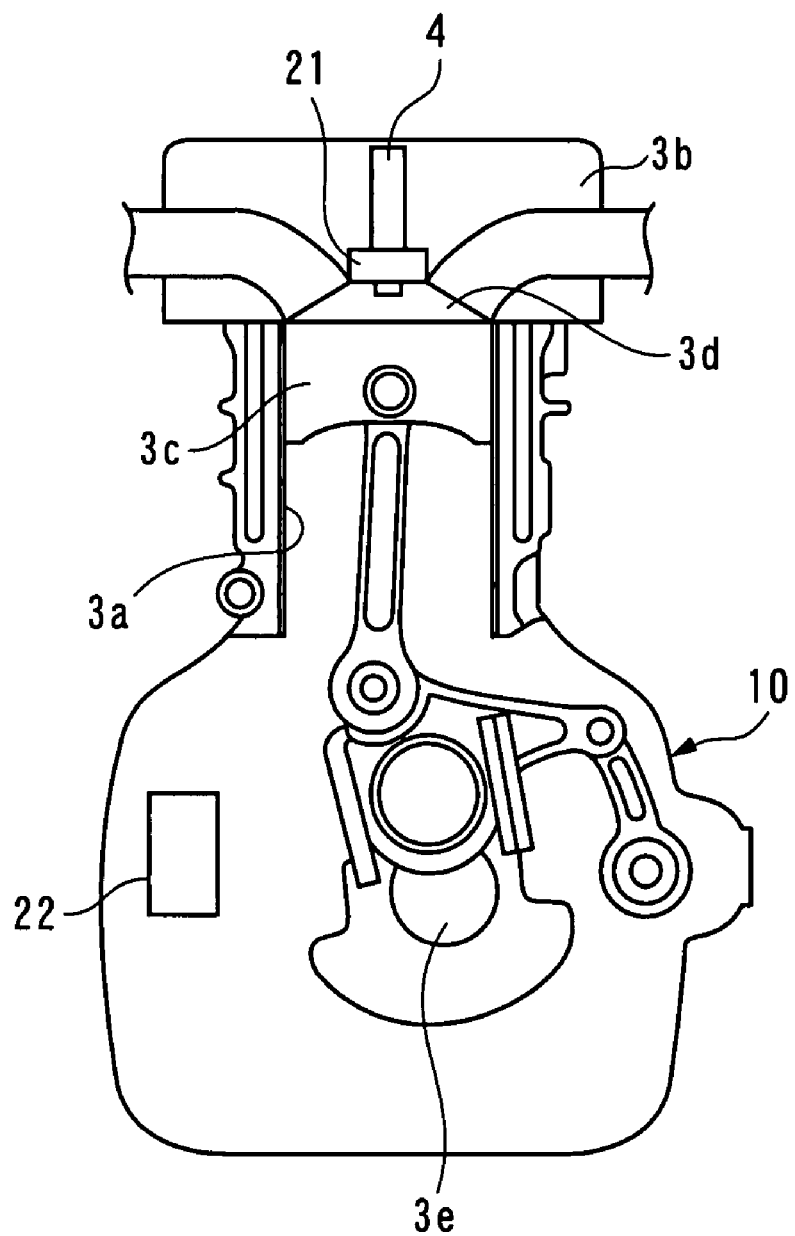
FIG. 1 is a diagram generally showing the internal combustion engine to which a workload calculation apparatus according to one embodiment of the present invention is applied.

In the following, a preferred embodiment of the present invention will be described with reference to the drawings. FIG. 1 schematically illustrates the structure of an internal combustion engine (hereinafter called the "engine") 3 to which a workload calculation apparatus 1 according to the embodiment is applied. The workload calculation apparatus 1 comprises an ECU 2 (see FIG. 2) and calculates an indicated mean effective pressure $P_{mi}$ (workload parameter) of the engine 3 as described later.

As illustrated, the engine 3 is, for example, a four-cycle gasoline engine, and is mounted on a vehicle (not shown). The engine 3 comprises cylinders 3a, a cylinder head 3b and pistons 3c. The space enclosed by each cylinder 3a, the cylinder head 3b and each piston 3c forms a combustion chamber 3d. The cylinder head 3b is mounted with an ignition plug 4 facing toward the combustion chamber 3d. The ignition plug 4 is integrally mounted with an in-cylinder pressure sensor 21 (in-cylinder pressure change amount data detecting means). The in-cylinder pressure sensor 21, which is of, for example, a piezoelectric element type, has a piezoelectric element (not shown) becoming displaced in accordance with a change in the pressure in the combustion chamber 3d (hereinafter called the "in-cylinder pressure") and therefore outputs to an ECU 2 a detection signal (hereinafter called the "in-cylinder pressure change amount data") dP indicative of the amount of change in the in-cylinder pressure.

A crank angle sensor 22 (angle position detecting means) is mounted on a crankshaft 3e of the engine 3. The crank angle sensor 22 outputs to the ECU 2 a TDC signal and a CRK signal, which are both pulse signals, in association with the rotation of the crankshaft 3e. The TDC signal is outputted every time the piston 3c reaches a position corresponding to a predetermined crank angle near TDC (Top Dead Center) at the start of the intake stroke. The CRK signal is outputted at every predetermined crank angle (for example, 30 degrees) with reference to the TDC signal.

Figure 3A:
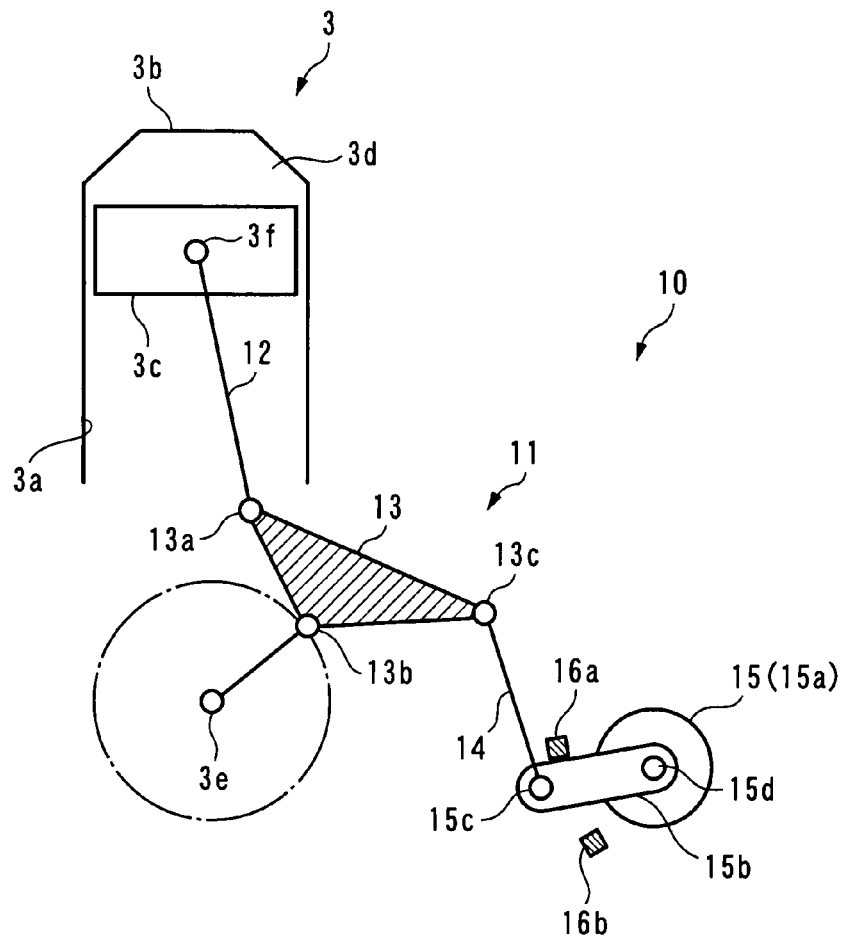
FIG. 3A is a schematic diagram showing the entire structure of a variable compression ratio mechanism when a minimum compression ratio is set.

The engine 3 comprises a variable compression ratio mechanism 10 (variable mechanism). The variable compression ratio mechanism 10 changes the TDC position and the BDC position of the piston 3c, namely the stroke of the piston 3c in order to steplessly change a compression ratio Cr of the engine 3 between a predetermined maximum value Cr_H and a predetermined minimum value Cr_L. As illustrated in FIG. 3A, the variable compression ratio mechanism 10 comprises a complex link mechanism 11 coupled between the piston 3c and the crankshaft 3e of the engine 3, and a compression ratio actuator 15 coupled to the complex link mechanism 11.

The complex link mechanism 11 is made up of an upper link 12, a lower link 13, a control link 14 and the like. The upper link 12, which correspond to a so-called connecting rod, has the upper end rotatably coupled to the piston 3c through a piston pin 3f, and has the lower end rotatably coupled to an end of the lower link 13 through a pin 13a.

The lower link 13 has a triangular shape and is respectively coupled at the two ends, other than the end coupled to the upper link 12, to the crankshaft 3e through a crank pin 13b and to one end of the control link 14 through a control pin 13c. By virtue of the foregoing structure, the reciprocating motion of the piston 3c is transferred to the crankshaft 3e through the complex link mechanism 11, and is then converted to the rotational motion of the crankshaft 3e.

The compression ratio actuator 15 is constituted of a combination of a motor (not shown) and a reduction gear train (not shown) which are connected to the ECU 2, and is driven by the ECU 2 as described later. The compression ratio actuator 15 comprises a casing 15a, an arm 15b, a control shaft 15c and the like. The casing 15a houses the motor and the reduction gear train. One end of the arm 15b is fixed to the leading end of a rotating shaft 15d of the reduction gear train, whereby the arm 15b pivots about the rotating shaft 15d in association with the rotation of the motor. The other end of the arm 15b is rotatably coupled to the control shaft 15c. The control shaft 15c extends in a direction perpendicular to the plane of the drawing in FIG. 3A as in the case of the crankshaft 3e, and is connected to the opposite end of the control link 14 to that coupled to the control pin 13c.

Figure 3B:
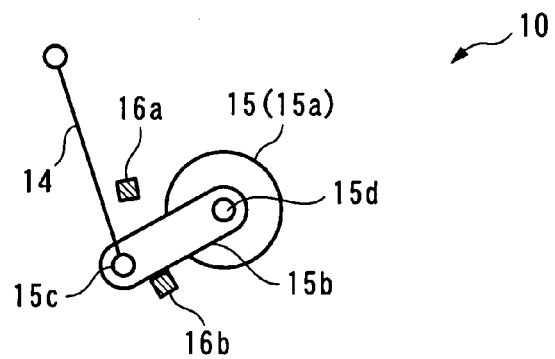
FIG. 3B is a schematic diagram showing the structure of the portion of the variable compression ratio mechanism located close to the compression ratio actuator when a maximum compression ratio is set.

A minimum compression ratio stopper 16a and a maximum compression ratio stopper 16b are provided at a distance from each other in the vicinity of the arm 15b to restrict the rotating range of the arm 15b. Specifically, when the motor is rotated in the clockwise/counterclockwise direction by a drive signal from the ECU 2, the arm 15b rotates within the range between a minimum compression ratio position (shown in FIG. 3A) in which the arm 15b comes into contact with and rests against the minimum compression ratio stopper 16a and a maximum compression ratio position (shown in FIG. 3B) in which the arm 15b comes into contact with and rests against the maximum compression ratio stopper 16b.

By virtue of the foregoing structure, in the variable compression ratio mechanism 10, when the arm 15b is closer to or in contact with the minimum compression ratio stopper 16a, the rotating shaft 15d of the compression ratio actuator 15 rotates in the counterclockwise direction in FIG. 3A, whereupon, with this rotation, the arm 15b rotates in the counterclockwise direction in FIG. 3A. As the rotation of the arm 15b moves the entire control link 14 downward, the lower link 13 pivots about the crank pin 13b in the clockwise direction, and also the upper link 12 pivots about the piston pin 3f in the counterclockwise direction. As a result, the arrangement of the piston pin 3f, the upper pin 13a and the crank pin 13b becomes straighter than in the case when the arm 15b is in the minimum compression ratio position, thus increasing the straight distance between the piston pin 3f and the crank pin 13b when the piston 3c reaches TDC. Because of this, the stroke volume is increased and the volume of the combustion chamber 3d when the piston 3c is at TDC is decreased, resulting in an increase in compression ratio Cr.

In contrast to the foregoing, when the arm 15b is closer to or in contact with the maximum compression ratio stopper 16b, the rotating shaft 15d of the actuator 15 rotates in the clockwise direction, whereupon, with this rotation, the arm 15b rotates in the clockwise direction, so as to move the entire control link 14 upward. Then, the operation in reverse order to the above order rotates the lower link 13 in the counterclockwise direction, and the upper link 12 in the clockwise direction. As a result, the straight distance between the piston pin 3f and the crank pin 13b when the piston 3c reaches TDC is shortened, thus decreasing the stroke volume and increasing the volume of the combustion chamber 3d when the piston 3c is at TDC. As a result, the compression ratio Cr is reduced. As described above, in the variable compression ration mechanism 10, the rotation of the arm 15b between the minimum compression ratio stopper 16a and the maximum compression ratio stopper 16b steplessly varies the compression ratio Cr between the minimum value Cr_L and the maximum value Cr_H.

Figure 2:
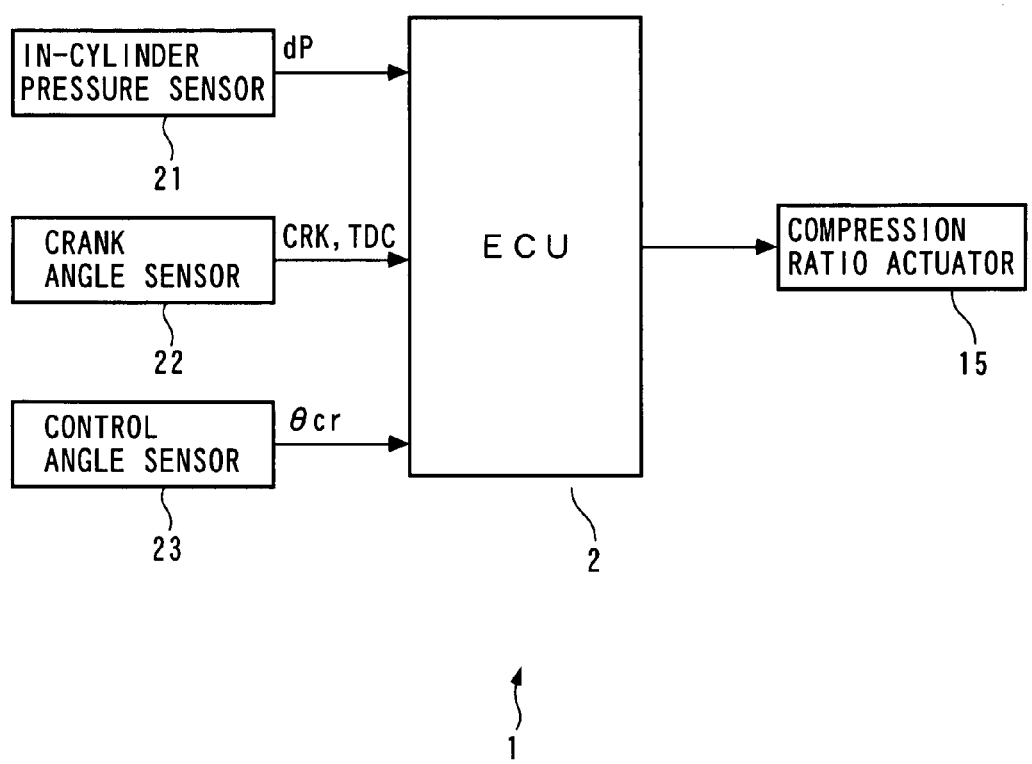
FIG. 2 is a block diagram generally showing the workload calculation apparatus according to the embodiment.

A control angle sensor 23 (parameter detecting means) is provided in the casing 15a of the compression ratio actuator 15 (see FIG. 2). The control angle sensor 23 outputs to the ECU 2 a detection signal indicative of a rotating angle θcr of the rotating shaft 15d, namely the arm 15b. The ECU 2 calculates the compression ratio Cr (parameter) on the basis of the detection signal of the control angle sensor 23.

The ECU 2 is based on a microcomputer which comprises an I/O interface, a CPU, a RAM, a ROM and the like. The outputs from a variety of aforementioned sensors 21-23 are A/D converted and shaped by the I/O interface, and then sent to the CPU. In response to these input signals, the ECU 2 calculates the indicated mean effective pressure $P_{mi}$ in accordance with a program stored in the ROM. It should be noted that, in the embodiment, the ECU 2 corresponds to first correlation function setting means, reference signal generating means, second correlation function calculating means, workload parameter calculating means, volume data generating means, parameter detecting means and storing means.

Next, a description will be given of the concept of the method of calculating the indicated mean effective pressure $P_{mi}$ according to the embodiment. The following Equation (1) is a general calculating formula for the indicated mean effective pressure $P_{mi}$.

$$P_{mi} = \frac{1}{V_s}\oint PdV \tag{1}$$

In the above Equation (1), $V_s$ is a stroke volume of the engine 3, P is in-cylinder pressure data indicative of a in-cylinder pressure, and dV is volumetric change rate data indicative of the rate of change in the volume of the combustion chamber 3d. In this way, the indicated mean effective pressure $P_{mi}$ is calculated by dividing, by the stroke volume $V_s$, the value derived from the line integral of the product of the in-cylinder pressure data P and the volumetric change rate data dV, that is, the value obtained by integrating the product over one combustion cycle. Note that, in the embodiment, the volumetric change rate data dV corresponds to volume data.

Since the volumetric change rate data dV varies within a period of one combustion cycle, the volumetric change data dV is expressed using Fourier series for each frequency component as in the following Equations (2)-(5).

$$\frac{dV}{d\theta} = \frac{V_{a0}}{2} + \sum_{k=1}^{\infty}(V_{ak}\cos k\theta + V_{bk}\sin k\theta) \tag{2}$$

$$V_{a0} = \frac{2}{T}\oint dVd\theta \tag{3}$$

$$V_{ak} = \frac{2}{T}\oint dV\cos k\theta d\theta \tag{4}$$

$$V_{bk} = \frac{2}{T}\oint dV\sin k\theta d\theta \tag{5}$$

In the above Equations (2)-(5), $V_{a0}$ is an amplitude offset of the volumetric change rate data dV, k is the order of the frequency component of the integral multiple of the rotational frequency of the engine 3 (hereinafter called the "integral order component of the engine rotational speed"), and θ is a crank angle with reference to TDC at the start of the intake stroke. $V_{ak}$ is a Fourier coefficient with respect to the integral order component of the engine rotational speed from among the cosine wave components in the volumetric change rate data dV (hereinafter called the "first volumetric change rate Fourier coefficient"), and $V_{bk}$ is a Fourier coefficient with respect to the integral order component of the engine rotational speed from among the sine wave components in the volumetric change rate data dV (hereinafter called the "second volumetric change rate Fourier coefficient"). T is a crank angle θ required for achieving a single combustion cycle, that is, 720° in the embodiment. Note that, in the embodiment, the first and second volumetric change rate Fourier coefficients $V_{ak}$, $V_{bk}$ correspond to a first correlation function.

Substitution of the foregoing Equation (2) into Equation (1) yields the indicated mean effective pressure $P_{mi}$ expressed by the following Equation (6). Then, by development of Equation (6), the indicated mean effective pressure $P_{mi}$ is expressed by the following Equation (7).

$$P_{mi} = \frac{1}{V_s}\oint P\left\{\frac{V_{a0}}{2} + \sum_{k=1}^{\infty}(V_{ak}\cos k\theta + V_{bk}\sin k\theta)\right\}d\theta \quad (6)$$

$$P_{mi} = \frac{V_{a0}}{2V_s}\oint P d\theta + \frac{V_{a1}}{V_s}\oint P\cos\theta d\theta + \frac{V_{a2}}{V_s}\oint P\cos 2\theta d\theta + \quad (7)$$
$$\ldots + \frac{V_{b1}}{V_s}\oint P\sin\theta d\theta + \frac{V_{b2}}{V_s}\oint P\sin 2\theta d\theta + \ldots$$

Since the in-cylinder pressure data P also varies within a period of one combustion cycle, the in-cylinder pressure data P is expressed using Fourier series for each frequency component as in the following Equations (8)-(11).

$$P = \frac{P_{a0}}{2} + \sum_{k=1}^{\infty}(P_{ak}\cos k\theta + P_{bk}\sin k\theta) \quad (8)$$

$$P_{a0} = \frac{2}{T}\oint P d\theta \quad (9)$$

$$P_{ak} = \frac{2}{T}\oint P\cos k\theta d\theta \quad (10)$$

$$P_{bk} = \frac{2}{T}\oint P\sin k\theta d\theta \quad (11)$$

In the above Equations (8)-(11), $P_{a0}$ is an amplitude offset of the in-cylinder pressure data P. $P_{ak}$ is a Fourier coefficient with respect to the integral order component of the engine rotational speed from among the cosine wave components in the in-cylinder pressure data P, and $P_{bk}$ is a Fourier coefficient with respect to the integral order component of the engine rotational speed from among the sine wave components in the in-cylinder pressure data P.

Substituting the foregoing Equations (9)-(11) into Equation (7) and summing up the result, the indicated mean effective pressure $P_{mi}$ is expressed by the following Equation (12).

$$P_{mi} = \frac{T}{4V_s}P_{a0}V_{a0} + \frac{T}{2V_s}\left(\sum_{k=1}^{\infty}P_{ak}V_{ak} + \sum_{k=1}^{\infty}P_{bk}V_{bk}\right) \quad (12)$$

The in-cylinder pressure change amount data dP outputted from the aforementioned in-cylinder pressure sensor 11 is expressed using Fourier series for each frequency component as in the following Equations (13)-(16).

$$dP = \frac{d_{a0}}{2} + \sum_{k=1}^{\infty}(d_{ak}\cos k\theta + d_{bk}\sin k\theta) \quad (13)$$

$$d_{a0} = \frac{2}{T}\oint dP d\theta \quad (14)$$

$$d_{ak} = \frac{2}{T}\oint dP\cos k\theta d\theta \quad (15)$$

$$d_{bk} = \frac{2}{T}\oint dP\sin k\theta d\theta \quad (16)$$

In the above Equations (13)-(16), $d_{a0}$ is an amplitude offset of the in-cylinder pressure change amount data dP, $d_{ak}$ is a Fourier coefficient with respect to the integral order component of the engine rotational speed from among the cosine wave components in the in-cylinder pressure change amount data dP (hereinafter called the "first in-cylinder pressure change amount Fourier coefficient"), and $d_{bk}$ is a Fourier coefficient with respect to the integral order component of the engine rotational speed from among the sine wave components in the in-cylinder pressure change amount data dP (hereinafter called the "second in-cylinder pressure change amount Fourier coefficient"). It should be noted that, in the embodiment, the first and second in-cylinder pressure change amount Fourier coefficients $d_{ak}$, $d_{bk}$ correspond to a second correlation function.

Since the in-cylinder pressure change amount data dP is expressed by Equation (13) and the in-cylinder pressure data P is obtained by integrating the in-cylinder pressure change amount data dP, the in-cylinder pressure data P is expressed by the following Equation (17).

$$P = \int dP d\theta \quad (17)$$
$$= \int\left\{\frac{d_{a0}}{2} + \sum_{k=1}^{\infty}(d_{ak}\cos k\theta + d_{bk}\sin k\theta)\right\}d\theta$$
$$= \frac{d_{a0}}{2}\times\theta + \sum_{k=1}^{\infty}\left(\frac{d_{ak}}{k}\sin k\theta - \frac{d_{bk}}{k}\cos k\theta\right)$$

The in-cylinder pressure data P expressed by Equation (17) and the in-cylinder pressure data expressed by Equation (8) are equal to each other. As a result, the following Equations (18)-(20) are established.

$$P_{a0} = d_{a0}\times\theta \quad (18)$$

$$P_{ak} = -\frac{d_{bk}}{k} \quad (19)$$

$$P_{bk} = \frac{d_{ak}}{k} \quad (20)$$

Substituting these Equations (18)-(20) into Equation (12), the indicated mean effective pressure $P_{mi}$ is expressed by the following Equation (21). Since the offset $V_{a0}$ is approximately zero in Equation (21), the first term on the right side is omitted, and as a result the indicated mean effective pressure $P_{mi}$ is expressed by Equation (22).

$$P_{mi} = \frac{T}{4V_s}d_{a0}\times\theta\times V_{a0} + \frac{T}{2V_s}\left(\sum_{k=1}^{\infty}\frac{d_{ak}V_{bk}}{k} - \sum_{k=1}^{\infty}\frac{d_{bk}V_{ak}}{k}\right) \quad (21)$$

$$P_{mi} = \frac{T}{2V_s}\left(\sum_{k=1}^{\infty}\frac{d_{ak}V_{bk}}{k} - \sum_{k=1}^{\infty}\frac{d_{bk}V_{ak}}{k}\right) \quad (22)$$

In the embodiment, Equations (4), (5), (15), (16) and (22) are used to calculate the indicated mean effective pressure $P_{mi}$. Specifically, the in-cylinder pressure change amount data dP is not integrated, but is used without processing to calculate the Fourier coefficients $d_{ak}$, $d_{bk}$, and then, based on the first and second in-cylinder pressure change amount Fourier coefficients $d_{ak}$, $d_{bk}$ thus calculated, the indicated mean effective pressure $P_{mi}$ is calculated.

Figure 4:
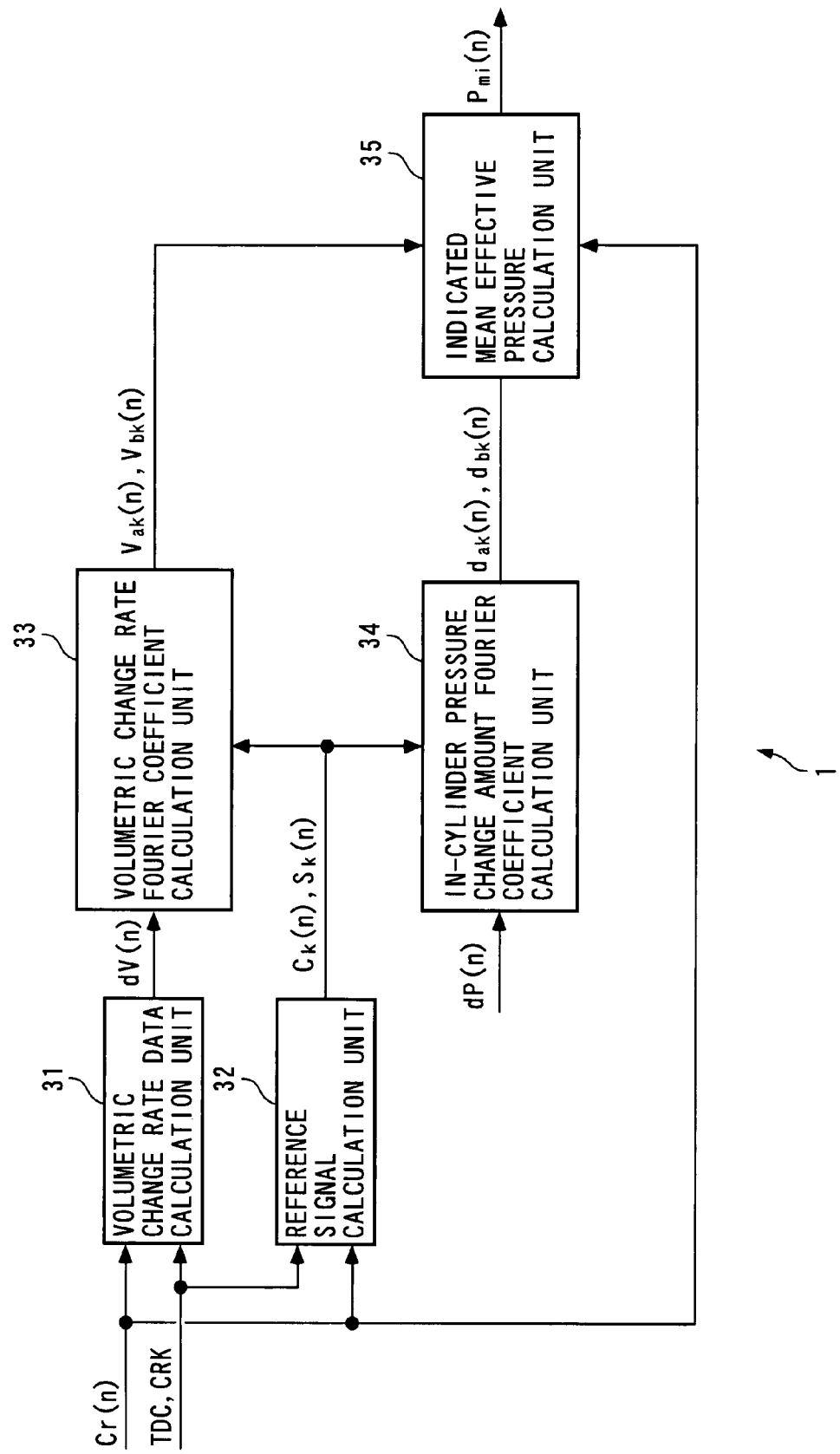
FIG. 4 is a functional block diagram generally showing the workload calculation apparatus according to the first embodiment.

FIG. 4 illustrates the workload calculation apparatus 1 according to a first embodiment of the present invention, which performs the calculations as described above. The workload calculation apparatus 1 comprises a volumetric change rate data calculation unit 31 (volume data generating means), a reference signal calculation unit 32 (reference signal generating means), a volumetric change rate Fourier coefficient calculation unit 33 (first correlation function setting means), an in-cylinder pressure change amount Fourier coefficient calculation unit 34 (second correlation function calculating means) and an indicated mean effective pressure calculation unit 35 (workload parameter calculating means), all of which are implemented by the ECU 2.

Figure 5:
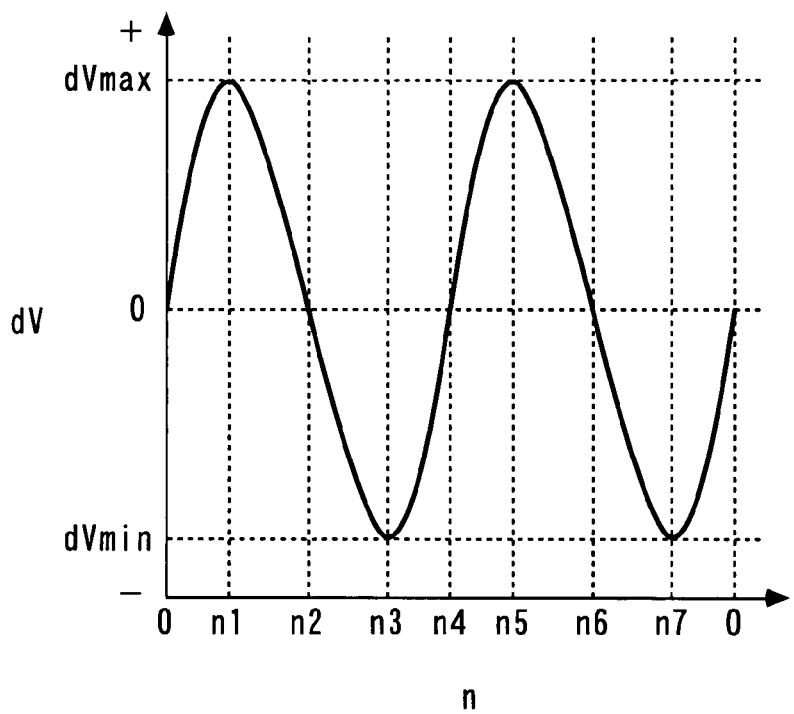
FIG. 5 is an example of a dV table used in the calculation for volumetric change rate data dV.

The volumetric change rate data calculation unit 31 calculates the volumetric change rate data dV by searching the dV table shown in FIG. 5 in accordance with a sampling number n and the compression ratio Cr, and then outputs the volumetric change rate data dV thus calculated to the indicated mean effective pressure calculation unit 35. The sampling number n represents discrete time points. The sampling number n is reset to value 0 on each reception of the TDC signal and is incremented on each reception of the CRK signal. In other words, the sampling number n changes from zero to 23 in each combustion cycle. Discrete data followed by each sampling number n indicates data which is sampled or calculated on each reception of the CRK signal. The above-described sampling number n is set in accordance with the setting of order k described later. In the following description, the sampling number n in each discrete data are omitted where appropriate.

The dV table shows the rates of change in the actual volume of the combustion chamber 3d presented in a diagrammatic form in accordance with the movement of the piston 3. For this reason, the volumetric change rate data dV(n) is set approximately in a sine wave form. The dV table comprises a plurality of tables in which the rate of change in volume is set for each compression ratio Cr falling within the aforementioned range between the minimum value Cr_L and the maximum value Cr_H (FIG. 5 shows one of the tables). When the compression ratio Cr shows an intermediate value, the volumetric change rate data dV(n) is evaluated by an interpolation operation.

Specifically, in the dV table, the volumetric change rate data dV(n) is set to value 0 when the sampling number n is value 0 (at the time of receiving the TDC signal), then to a maximum value dVmax when the sampling number n is value n1 corresponding to approximately the mid-point between the TDC and the next BDC, and then to value 0 when the sampling number n is value n2 corresponding to this BDC. Then, the volumetric change rate data dV(n) is set to a minimum value dVmin which is a negative value when the sampling number n is value n3 corresponding to approximately a mid-point between the BDC and the next TDC (at the time of starting the expansion stroke), and is set to value 0 when the sampling number n is value n4 corresponding to this TDC. Then, from value n4 to value 0 corresponding to the period from this TDC to the time of receiving the next TDC signal, the volumetric change rate data dV(n) is set as in the above-described case of value 0 to value n4. The higher the compression ratio Cr, the larger the stroke volume $V_s$ becomes. For this reason, the maximum value dVmax is set as large as possible and the minimum value dVmin is set as small as possible. In this manner, the volumetric change rate data dV(n) is able match the rate of change in the actual volume of the combustion change 3b.

The reference signal calculation unit 32 calculates a cos signal $C_k(n)$ and a sin signal $S_k(n)$ and outputs the calculated signals to the volumetric change rate Fourier coefficient calculation unit 33 and the in-cylinder pressure change amount Fourier coefficient calculation unit 34. Note that, in the embodiment, the cos signal $C_k$ and the sin signal $S_k$ correspond to a reference signal. Specifically, the cos signal $C_k(n)$ and the sin signal $S_k(n)$ are calculated by the following Equations (23) and (24), in which the character N is the number of times the CRK signal is received during a combustion cycle, that is, the number of samplings, 720/30=24.

$$C_k(n) = \cos\{k \times (4\pi/N) \times n\} \quad (23)$$

$$S_k(n) = \sin\{k \times (4\pi/N) \times n\} \quad (24)$$

In these calculations, the order k is set to the order of the frequency component favorably indicative of the rate of change in the volume of the combustion chamber 3d in the volumetric change rate data dV. Thereby, the order k is set to either value 1 or from value 1 to a predetermined value. For example, the order k is set to value 1 when the compression ratio Cr is equal to or higher than the minimum value Cr_L and equal to or lower than a first predetermined value Cr1, and set to value 1 and value 2 when the compression ratio Cr is equal to or higher than the first predetermined value Cr1 and equal to or lower than the maximum value Cr_H. When a plurality of orders k are set, a cos signal $C_k(n)$ and a sin signal $S_k(n)$ are calculated for each order k thus set.

The volumetric change rate Fourier coefficient calculation unit 33 receives and uses the volumetric change rate data dV(n), the cos signal $C_k(n)$ and the sin signal $S_k(n)$ to calculate the first and second volumetric change rate Fourier coefficients $V_{ak}(n)$, $V_{bk}(n)$ by the following respective Equations (25), (26), and then output the Fourier coefficients $V_{ak}(n)$, $V_{bk}(n)$ thus calculated to the indicated mean effective pressure calculation unit 35. In this manner, when a plurality of orders k are set, the first and second volumetric change rate Fourier coefficients $V_{ak}(n)$, $V_{bk}(n)$ are calculated for each order k. It should be noted that Equations (25) and (26) are of discrete time systems, into which the aforementioned Equations (4) and (5) of a continuous time system are converted respectively.

$$V_{ak} = \frac{2}{N}\sum_{n=0}^{N-1}\{dV(n) \times C_k(n)\} \quad (25)$$

$$V_{bk} = \frac{2}{N}\sum_{n=0}^{N-1}\{dV(n) \times S_k(n)\} \quad (26)$$

The in-cylinder pressure change amount Fourier coefficient calculation unit 34 receives and uses the cos signal $C_k(n)$, the sin signal $S_k(n)$ and the in-cylinder pressure change amount data dP(n) to calculate the first and second in-cylinder pressure change amount Fourier coefficients $d_{ak}$, $d_{bk}$ by the following respective Equations (27), (28), and then output the Fourier coefficients $d_{ak}$, $d_{bk}$ thus calculated to the indicated mean effective pressure calculation unit 35. In this manner, when a plurality of orders k are set, the first and second in-cylinder pressure change amount Fourier coefficients $d_{ak}$, $d_{bk}$ are calculated for each order k. It should be noted that Equations (27) and (28) are of discrete time systems, into which the aforementioned Equations (15) and (16) of a continuous time system are converted respectively.

$$d_{ak} = \frac{2}{N}\sum_{n=0}^{N-1}\{dP(n) \times C_k(n)\} \quad (27)$$

$$d_{bk} = \frac{2}{N}\sum_{n=0}^{N-1}\{dP(n) \times S_k(n)\} \quad (28)$$

The indicated mean effective pressure calculation unit 35 receives and uses the volumetric change rate Fourier coefficients $V_{ak}$, $V_{bk}$ and the in-cylinder pressure change amount Fourier coefficients $d_{ak}$, $d_{bk}$ to calculate the indicated mean effective pressure $P_{mi}$ by the following Equation (29). It should be noted that Equation (29) is of a discrete time system, into which the aforementioned Equation (22) of a continuous time system is converted. In Equation (29), the order k is the maximum value.

$$P_{mi} = \frac{N}{2V_s}\left(\sum_{k=1}^{K}\frac{d_{ak}V_{bk}}{K} - \sum_{k=1}^{K}\frac{d_{bk}V_{ak}}{K}\right) \quad (29)$$

Figure 6:
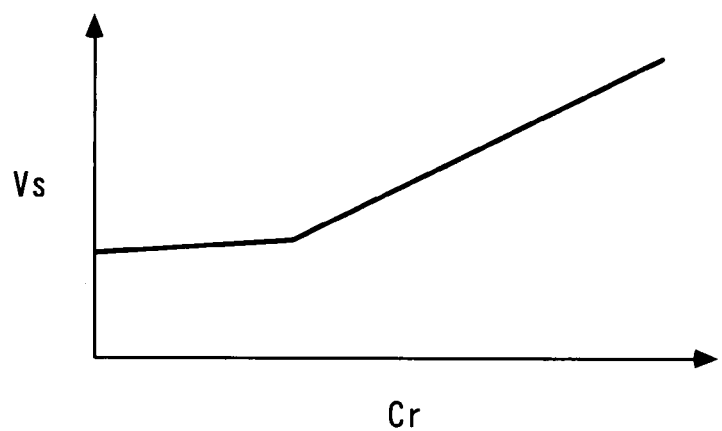
FIG. 6 is an example of a $V_S$ table used for the calculation of stroke volume $V_S$.

The stroke volume $V_s$ in this Equation (29) is calculated by searching the $V_s$ table shown in FIG. 6 in accordance with the compression ratio Cr. The $V_s$ table shows the actual stroke volumes $V_s$ presented in a diagrammatic form in accordance with the compression ration Cr. With an increase in the compression ratio Cr, the stroke volume $V_s$ is set to a higher value.

As described above, according to the foregoing first embodiment, for the calculation of the first and second in-cylinder pressure change amount Fourier coefficients $d_{ak}$, $d_{bk}$, the in-cylinder pressure change amount data dP is directly used without being integrated. In consequence, unlike the conventional calculation, even in a transition period in which the in-cylinder pressure peak value varies from combustion cycle to combustion cycle, the first and second in-cylinder pressure change amount Fourier coefficients $d_{ak}$, $d_{bk}$ can be correctly calculated without incurring a reduction in calculation accuracy caused by the integral operation of the in-cylinder pressure change amount data dP. As a result, the accurate calculation of the indicated mean effective pressure $P_{mi}$ is achieved. Also, because the in-cylinder pressure change amount data dP is not integrated, the operation load for the indicated mean effective pressure $P_{mi}$ is reduced. In addition, since the existing in-cylinder pressure sensor 21 is used for the calculation of the indicated mean effective pressure $P_{mi}$, further additional provision of components is not required, resulting in avoidance of an increase in cost of the workload calculation apparatus 1. Further, the indicated mean effective pressure $P_{mi}$ thus accurately calculated can be used appropriately for engine control and the like.

The order k of the cos signal $C_k$ and the sin signal $S_k$ is set to the order of a frequency component satisfactory indicative of the rate of change of the combustion chamber 3d from among the volumetric change rate data dV. Thus, the volumetric change rate Fourier coefficients $V_{ak}$, $V_{bk}$ can be correctly calculated, resulting in more accurate calculation of the indicated mean effective pressure $P_{mi}$. Also, for the same reason, the number of volumetric change rate Fourier coefficients $V_{ak}$, $V_{bk}$ calculated can be minimized, thereby further reducing the operation load for the indicated mean effective pressure $P_{mi}$.

Also, the order k is set as described earlier, and the in-cylinder pressure change amount data dP and the volumetric change rate data dV are sampled at a relatively low frequency whenever the CRK signal is received, that is, at every crank angle 30°. As a result, the calculation accuracy of the indicated mean effective pressure $P_{mi}$ is ensured, and simultaneously, the number of in-cylinder pressure change amount data dp and volumetric change rate data dV used in this calculation can be minimized, thus making it possible to further reduce the operation load for the indicated mean effective pressure $P_{mi}$. In addition, by setting a lower sampling frequency of the in-cylinder pressure change amount data dP as described above, the influence of noise and the like included particularly in a high frequency component of the in-cylinder pressure change amount data dP is removed, and thus the indicated mean effective pressure $P_{mi}$ can be more accurately calculated.

Also, the volumetric change rate data dV is calculated and the volumetric change rate Fourier coefficients $V_{ak}$, $V_{bk}$ are calculated based on the volumetric change rate data dV thus calculated. This makes it possible to calculate the volumetric change rate Fourier coefficients $V_{ak}$, $V_{bk}$ to a correct value reflecting the rate of change in the actual volume of the combustion chamber 3d, thus in turn more accurately calculating the indicated mean effective pressure $P_{mi}$. Also, since the sampling number n is set in response to the TDC signal and the CRK signal, and the volumetric change rate data dV, the cos signal $C_k$, and the sin signal $S_k$ are calculated based on the sampling number n thus set, the volumetric change rate data dV, the cos signal $C_k$ and the sin signal $S_k$ can be correctly synchronized in phase with one another and the in-cylinder pressure change amount data dP, the cos signal $C_k$ and the sin signal $S_k$ can be correctly synchronized in phase with one another. As a result, a more appropriate calculation of the volumetric change rate Fourier coefficients $V_{ak}$, $V_{bk}$ and the in-cylinder pressure change amount Fourier coefficients $d_{ak}$, $d_{bk}$ is achieved.

Further, since the volumetric change rate data dV is calculated in accordance with the compression ratio Cr, the volumetric change rate Fourier coefficients $V_{ak}$, $V_{bk}$ can be correctly calculated. Also, since the order k of the cos signal $C_k$ and the sin signal $S_k$ is set in accordance with the compression ratio Cr, the volumetric change rate Fourier coefficients $V_{ak}$, $V_{bk}$ can be correctly calculated such that the rate of change in the volume of the combustion chamber 3d is satisfactorily reflected. For the same reason, the number of volumetric change rate Fourier coefficients $V_{ak}$, $V_{bk}$ calculated in accordance with the compression ratio Cr can be minimized, thereby further reducing the operation load for the indicated mean effective pressure $P_{mi}$.

It should be noted that the indicated mean effective pressure $P_{mi}$ may be calculated by the following calculation method in place of the foregoing calculation method. Specifically, as is apparent from the aforementioned dV table, since the rate of change in the volume of the combustion chamber 3d principally comprises the sin function of lower order, the second volumetric change rate Fourier coefficient $V_{bk}$ of lower order is mainly calculated and the first volumetric change rate Fourier coefficient $V_{ak}$ is calculated in accordance with the compression ratio Cr only when necessary. Also, in accordance with such calculation of the volumetric change rate Fourier coefficients $V_{ak}$, $V_{bk}$, the first in-cylinder pressure change amount Fourier coefficient $d_{ak}$ is mainly calculated, and the second in-cylinder pressure change amount Fourier coefficient $d_{bk}$ is calculated in accordance with the compression ratio Cr only when necessary. Also, the aforementioned Equation (29) is modified for use such that a term using the Fourier coefficient $d_{bk}$, $V_{ak}$ involved in the calculation is omitted. A calculation method as described above makes it possible to further reduce the operation load for the indicated mean effective pressure $P_{mi}$.

Figure 7:
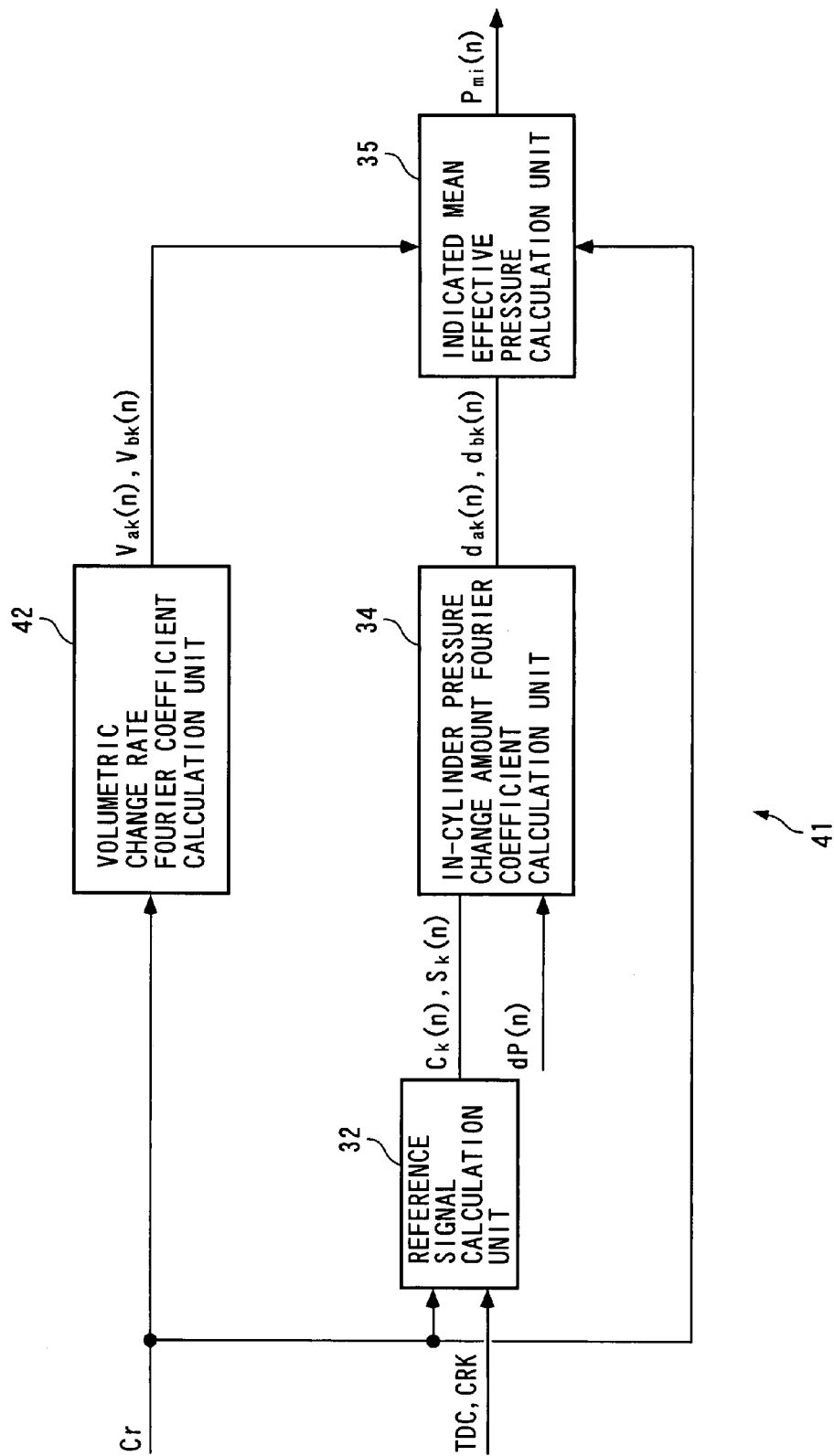
FIG. 7 is a functional block diagram generally showing a workload calculation apparatus according to a second embodiment.

Next, a workload calculation apparatus 41 according to a second embodiment of the present invention will be described with reference to FIG. 7. In the embodiment, in contrast to the above-described first embodiment, the first and second volumetric change rate Fourier coefficients $V_{ak}$, $V_{bk}$ are not calculated based on the volumetric change rate data dV, but calculated by searching for a predetermined value stored therein in accordance with the compression ratio Cr. For this reason, in contrast to the workload calculation apparatus 1 of the first embodiment, the workload calculation apparatus 41 does not comprise the volumetric change rate data calculation unit 31, and comprises a volumetric change rate Fourier coefficient calculation unit 42 (first correlation setting means, storing means) in place of the volumetric change rate Fourier coefficient calculation unit 33. The following is described with emphasis on the configuration of the volumetric change rate Fourier coefficient calculation unit 42.

The volumetric change rate Fourier coefficient calculation unit 42 searches the map shown in FIG. 8 in accordance with the compression ratio Cr to calculate the first and second volumetric change rate Fourier coefficients $V_{ak}$, $V_{bk}$, and outputs the results to the indicated mean effective pressure calculation unit 35. In this map, the volumetric change rate Fourier coefficients $V_{ak}$, $V_{bk}$ are evaluated in accordance with the compression ratio Cr through experiments and are stored as first to tenth predetermined values VREF1-VREF10. Specifically, the volumetric change rate Fourier coefficients $V_{ak}$, $V_{bk}$ are calculated (set) as described below.

That is, as shown in the top section in FIG. 8, when the compression ratio Cr is equal to the aforementioned minimum value Cr_L, first-order $V_{a1}$, $V_{b1}$ are set as the first and second volumetric change rate Fourier coefficients $V_{ak}$, $V_{bk}$, and of them the former $v_{a1}$ is set to the first predetermined value VREF 1 (e.g., value 0) and the later $V_{b1}$ is set to the second predetermined value VREF2 (e.g., value 4.3).

Also, as shown in the middle section in FIG. 8, when the compression ratio Cr is equal to the first predetermined value Cr1, first-order and second-order $V_{a1}$, $V_{a2}$, $V_{b1}$ $V_{b2}$ are set as the first and second volumetric change rate Fourier coefficients $V_{ak}$, $V_{bk}$. Specifically, the first-order $V_{a1}$ of the first volumetric change rate Fourier coefficients $V_{a1}$, $V_{a2}$ is set to the third predetermined value VREF3 (e.g., value 0) and the second-order $V_{a2}$ is set to the fourth predetermined VREF4 (e.g., value 0). Also, the first-order $V_{b1}$ of the second volumetric change rate Fourier coefficients $V_{bk}$ is set to the fifth predetermined value VREF5 (e.g., value 4.7), and the second-order $V_{b2}$ is set to the sixth predetermined value VREF6 (e.g., 3.0).

Also, as shown in the bottom section in FIG. 8, when the compression ratio Cr is equal to the aforementioned maximum value Cr_H, first-order and second-order $V_{a1}$, $V_{a2}$, $V_{b1}$ $V_{b2}$ are set as the first and second volumetric change rate Fourier coefficients $V_{ak}$, $V_{bk}$. Specifically, the first-order $V_{a1}$ of the first volumetric change rate Fourier coefficients $V_{ak}$ is set to the seventh predetermined value VREF7 (e.g., value 0.5) and the second-order $V_{a2}$ is set to the eighth predetermined VREF8 (e.g., value 0). Also, the first-order $V_{b1}$ of the second volumetric change rate Fourier coefficients $V_{bk}$ is set to the ninth predetermined value VREF9 (e.g., value 4.5), and the second-order $V_{b2}$ is set to the tenth predetermined value VREF10 (e.g., 3.5).

Also, when the compression ratio Cr is any value other than the minimum value Cr_L, the first predetermined value Cr1 and the maximum value Cr_H, the first and second volumetric change rate Fourier coefficients $V_{ak}$, $V_{bk}$ are calculated by an interpolation operation. As a result, the calculation accuracy of the indicated mean effective pressure $P_{mi}$ can be ensured.

The order k of the volumetric change rate Fourier coefficient $V_{ak}$, $V_{bk}$ in this case is set so as to correspond with the order of the frequency component satisfactorily representing the change state of the volume of the combustion chamber 3*d* as in the case of the aforementioned first embodiment.

As described above, according to the second embodiment, since the volumetric change rate Fourier coefficients $V_{ak}$, $V_{bk}$ are set to the first to tenth predetermined values VREF1-VREF10, the calculation of the volumetric change rate Fourier coefficients can be omitted, thus further reducing the operation load for the indicated mean effective pressure $P_{mi}$. Also, since the volumetric change rate Fourier coefficients $V_{ak}$, $V_{bk}$ are set to the first to tenth predetermined values VREF1-VREF10 in accordance with the compression ratio Cr, the appropriate setting of these Fourier coefficients $V_{ak}$, $V_{bk}$ is possible. In addition, for the same reason, the number of volumetric change rate Fourier coefficients $V_{ak}$, $V_{bk}$ set can be minimized, thus further reducing the operation load for the indicated mean effective pressure $P_{mi}$.

It should be noted that the indicated mean effective pressure $P_{mi}$ may be calculated by the following calculation method in place of the above-described calculation method. Specifically, as in the case of the aforementioned first embodiment, only the necessary first and second volumetric change rate Fourier coefficients $V_{ak}$, $V_{bk}$ are set (calculated) in accordance with the compression ratio Cr, and only the first and second in-cylinder pressure Fourier coefficients $d_{ak}$, $d_{bk}$, corresponding to the set volumetric change rate Fourier coefficients $V_{ak}$, $V_{bk}$ are calculated. The aforementioned Equation (29) is modified for use such that a term using the Fourier coefficient $d_{bk}$, $V_{ak}$ which are not evaluated is omitted. This makes it possible to further reduce the operation load for the indicated mean effective pressure $P_{mi}$.

The present invention is not limited to the foregoing embodiments, and can be carried out in a variety of modes. For example, the first and second embodiments (hereinafter called "the embodiment") are examples of the present invention when applied to the engine 3 with the variable compression ratio mechanism 10. However, the present invention is not limited to these examples, and is applicable to an engine which is not equipped with the variable compression ratio mechanism 10 so as to be incapable of changing the compression ratio Cr. In this case, as described earlier, because the volumetric change rate data dV principally comprises a sine function of lower order, for example, the second volumetric change rate Fourier coefficients $V_{b1}$, $V_{b2}$ and the first in-cylinder pressure change amount Fourier coefficients $d_{a1}$, $d_{a2}$, which are of up to second order, are used to achieve accurate calculation of the indicated mean effective pressure $P_{mi}$. Also, the embodiment has shown the use of the variable compression ratio mechanism 10 as a variable mechanism to change both the compression ratio Cr and the stroke volume $V_s$, but it goes without saying that a variable compression ratio mechanism changing either the compression ratio Cr or the stroke volume $V_s$ can be used.

In the embodiment, the Fourier coefficients $d_{ak}$, $d_{bk}$, $V_{ak}$, $V_{bk}$ are calculated by use of Fourier series expansion. However, the Fourier coefficients may be calculated by use of fast Fourier transform. By so doing, the operation load for the indicated mean effective pressure $P_{mi}$ can be further reduced. The volumetric change rate data calculation unit 31 and the reference signal calculation unit 32 may be implemented by an electric circuit, instead of the processing program of the embodiment. Further, the embodiment has shown the use of the volumetric change rate data dV as the volume data, but it is goes without saying that volume data indicating the volume of the combustion chamber 3d can be used.

The embodiment has shown the use of the compression ratio Cr as a parameter indicative of a compression ratio, but another suitable parameter, for example, a target value of a compression ratio Cr used for control of the variable compression ratio mechanism 10, can be used. Further, the embodiment has shown the calculation of the indicated mean effective pressure $P_{mi}$ as a workload parameter, but the present invention is not limited to this, and indicated output or torque of the engine 3 can be calculated based on the indicated mean effective pressure $P_{mi}$ calculated. The embodiment has shown the example when the present invention is applied to the engine 3 mounted on a vehicle. However the present invention is not limited to this, and is applicable to a variety of industrial internal combustion engines including a marine propulsion engine such as an outboard motor having the crank shaft extending in the vertical direction. In addition, changes in details of the configuration as necessary are possible within the spirit and scope of the invention.

What is claimed is:

1. A workload calculation apparatus for an internal combustion engine, which calculates a workload parameter indicative of a workload of the internal combustion engine having a combustion chamber, comprising:
    first correlation function setting means for setting a first correlation function indicative of an integral of the product of volume data indicating a change state of a volume of said combustion chamber and a reference signal having a predetermined frequency;
    reference signal generating means for generating the reference signal;
    in-cylinder pressure change amount data detecting means for detecting in-cylinder pressure change amount data indicative of the amount of change in pressure in the combustion chamber;
    second correlation function calculating means for calculating, on the basis of the generated reference signal and the detected in-cylinder pressure change amount data, a second correlation function indicative of an integral of the product of the reference signal and the in-cylinder pressure change amount data; and
    workload parameter calculating means for calculating the workload parameter on the basis of the first and second correlation functions.

2. A workload calculation apparatus for an internal combustion engine according to claim 1, wherein said in-cylinder pressure change amount data detecting means is an in-cylinder pressure sensor detecting the amount of change in pressure in the combustion chamber.

3. A workload calculation apparatus for an internal combustion engine according to claim 1, wherein said workload parameter includes an indicated mean effective pressure of the internal combustion engine.

4. A workload calculation apparatus for an internal combustion engine according to claim 1, wherein the predetermined frequency of the reference signal and the number of predetermined frequencies of the reference signal are set in accordance with the volume data.

5. A workload calculation apparatus for an internal combustion engine according to claim 1, further comprising,
    volume data generating means for generating the volume data,
    wherein said first correlation function setting means sets the first correlation function on the basis of the generated reference signal and the volume data.

6. A workload calculation apparatus for an internal combustion engine according to claim 5, further comprising,
    angle position detecting means for detecting an angle position of a crankshaft of the internal combustion engine,
    wherein said volume data generating means generates the volume data on the basis of the detected crankshaft angle position, and
    said reference signal generating means generates the reference signal on the basis of the detected crankshaft angle position.

7. A workload calculation apparatus for an internal combustion engine according to claim 5,
    wherein said first correlation function setting means sets, as the first correlation function, a Fourier coefficient evaluated by developing the volume data in Fourier series, and
    said second correlation function calculating means calculates, as the second correlation function, a Fourier coefficient evaluated by developing the in-cylinder pressure change amount data in Fourier series.

8. A workload calculation apparatus for an internal combustion engine according to claim 5, wherein said internal combustion engine comprises a variable mechanism that changes at least either a compression ratio or a displacement of the internal combustion engine,
    further comprising,
    parameter detecting means for detecting a parameter indicative of at least either the compression ratio or the displacement,
    wherein the volume data generating means generates the volume data in accordance with the detected parameter.

9. A workload calculation apparatus for an internal combustion engine according to claim 5, wherein said internal combustion engine comprises a variable mechanism that changes at least either a compression ratio or a displacement of the internal combustion engine,
    further comprising,
    parameter detecting means for detecting a parameter indicative of at least either the compression ratio or the displacement,
    wherein the reference signal generating means sets the predetermined frequency of the reference signal and the number of predetermined frequencies of the reference signal in accordance with the parameter.

10. A workload calculation apparatus for an internal combustion engine according to claim 1, wherein said first correlation function setting means sets the first correlation function to a predetermined value.

11. A workload calculation apparatus for an internal combustion engine according to claim 10, further comprising,
    angle position detecting means for detecting an angle position of a crankshaft of the internal combustion engine,
    wherein said reference signal generating means generates the reference signal on the basis of the angle position of the crankshaft.

12. A workload calculation apparatus for an internal combustion engine according to claim 10,
    wherein said second correlation function calculating means calculates, as the second correlation function, a Fourier coefficient evaluated by developing the in-cylinder pressure change amount data in Fourier series.

13. A workload calculation apparatus for an internal combustion engine according to claim 10, wherein said internal combustion engine comprises a variable compression ratio mechanism that changes at least either a compression ratio or a displacement of the internal combustion engine, further comprising,
parameter detecting means for detecting a parameter indicative of at least either the compression ratio or the displacement,
wherein said first correlation function setting means comprises storing means for storing a predetermined first correlation function value according to the compression ratio parameter as the predetermined value,
wherein the first correlation function setting means reads the first correlation function value according to the detected parameter to set the first correlation function.

14. A workload calculation method for an internal combustion engine, which is for calculating a workload parameter indicative of a workload of the internal combustion engine having a combustion chamber, comprising the steps of:
setting a first correlation function indicative of an integral of the product of volume data indicating a change state of a volume of said combustion chamber and a reference signal having a predetermined frequency;
generating the reference signal;
detecting in-cylinder pressure change amount data indicative of the amount of change in pressure in the combustion chamber;
calculating, on the basis of the generated reference signal and the detected in-cylinder pressure change amount data, a second correlation function indicative of an integral of the product of the reference signal and the in-cylinder pressure change amount data; and
calculating the workload parameter on the basis of the first and second correlation functions.

15. A workload calculation method for an internal combustion engine according to claim 14, wherein said step of detecting in-cylinder pressure change amount data uses an in-cylinder pressure sensor detecting the amount of change in pressure in the combustion chamber.

16. A workload calculation method for an internal combustion engine according to claim 14, wherein the workload parameter includes an indicated mean effective pressure of the internal combustion engine.

17. A workload calculation method for an internal combustion engine according to claim 14, wherein the predetermined frequency of the reference signal and the number of predetermined frequencies of the reference signal are set in accordance with the volume data.

18. A workload calculation method for an internal combustion engine according to claim 14, further comprising the step of volume data generating means for generating the volume data,
wherein said step of setting a first correlation function includes setting the first correlation function on the basis of the generated reference signal and the volume data.

19. A workload calculation method for an internal combustion engine according to claim 18, further comprising the step of detecting an angle position of a crankshaft of the internal combustion engine,
wherein said step of generating volume data includes generating the volume data on the basis of the detected crankshaft angle position, and
said step of generating a reference signal includes generating the reference signal on the basis of the detected crankshaft angle position.

20. A workload calculation method for an internal combustion engine according to claim 18,
wherein said step of setting a first correlation function includes setting, as the first correlation function, a Fourier coefficient evaluated by developing the volume data in Fourier series, and
said step of calculating a second correlation function includes calculating, as the second correlation function, a Fourier coefficient evaluated by developing the in-cylinder pressure change amount data in Fourier series.

21. A workload calculation method for an internal combustion engine according to claim 18, wherein the internal combustion engine comprises a variable mechanism that changes at least either a compression ratio or a displacement of the internal combustion engine,
further comprising the step of detecting a parameter indicative of at least either the compression ratio or the displacement,
wherein said step of generating volume data includes generating the volume data in accordance with the detected parameter.

22. A workload calculation method for an internal combustion engine according to claim 18, wherein the internal combustion engine comprises a variable mechanism that changes at least either a compression ratio or a displacement of the internal combustion engine,
further comprising the step of detecting a parameter indicative of at least either the compression ratio or the displacement,
wherein said step of generating a reference signal includes setting the predetermined frequency of the reference signal and the number of predetermined frequencies of the reference signal in accordance with the parameter.

23. A workload calculation method for an internal combustion engine according to claim 14, wherein said step of setting a first correlation function includes setting the first correlation function to a predetermined value.

24. A workload calculation method for an internal combustion engine according to claim 23, further comprising the step of detecting an angle position of a crankshaft of the internal combustion engine,
wherein said step of generating a reference signal includes generating the reference signal on the basis of the angle position of the crankshaft.

25. A workload calculation method for an internal combustion engine according to claim 23,
wherein said step of calculating a second correlation function includes calculating, as the second correlation function, a Fourier coefficient evaluated by developing the in-cylinder pressure change amount data in Fourier series.

26. A workload calculation method for an internal combustion engine according to claim 23, wherein the internal combustion engine comprises a variable compression ratio mechanism that changes at least either a compression ratio or a displacement of the internal combustion engine,
further comprising the steps of detecting a parameter indicative of at least either the compression ratio or the displacement,
wherein said step of setting a first correlation function includes storing a predetermined first correlation function value according to the compression ratio parameter as the predetermined value,
wherein said step of setting a first correlation function includes reading the first correlation function value according to the detected parameter to set the first correlation function.

27. An engine control unit including a control program for controlling calculation of a workload parameter indicative of a workload of an internal combustion engine having a combustion chamber, the program causing a computer to: set a first correlation function indicative of an integral of the product of volume data indicating a change state of a volume of said combustion chamber and a reference signal having a predetermined frequency; generate the reference signal; detect in-cylinder pressure change amount data indicative of the amount of change in pressure in the combustion chamber; calculate, on the basis of the generated reference signal and the detected in-cylinder pressure change amount data, a second correlation function indicative of an integral of the product of the reference signal and the in-cylinder pressure change amount data; and calculate the workload parameter on the basis of the first and second correlation functions.

28. An engine control unit according to claim 27, wherein said control program further causes the computer to detect the in-cylinder pressure change amount data by use of an in-cylinder pressure sensor detecting the amount of change in pressure in the combustion chamber.

29. An engine control unit according to claim 27, wherein said control program further causes the computer to use, as part of the workload parameter, an indicated mean effective pressure of the internal combustion engine.

30. An engine control unit according to claim 27, wherein said control program further causes the computer to set the predetermined frequency of the reference signal and the number of predetermined frequencies of the reference signal in accordance with the volume data.

31. An engine control unit according to claim 27, wherein said control program further causes the computer to generate the volume data; and to set the first correlation function on the basis of the generated reference signal and the volume data.

32. An engine control unit according to claim 31, wherein said control program further causes the computer to detect an angle position of a crankshaft of the internal combustion engine; to generate the volume data on the basis of the detected crankshaft angle position; and to generate the reference signal on the basis of the detected crankshaft angle position.

33. An engine control unit according to claim 31, wherein said control program further causes the computer to set, as the first correlation function, a Fourier coefficient evaluated by developing the volume data in Fourier series; and to calculate, as the second correlation function, a Fourier coefficient evaluated by developing the in-cylinder pressure change amount data in Fourier series.

34. An engine control unit according to claim 31, the internal combustion engine comprising a variable mechanism that changes at least either a compression ratio or a displacement of the internal combustion engine, wherein said control program further causes the computer to detect a parameter indicative of at least either the compression ratio or the displacement; and to generate the volume data in accordance with the detected parameter.

35. An engine control unit according to claim 31, the internal combustion engine comprising a variable mechanism that changes at least either a compression ratio or a displacement of the internal combustion engine, wherein said control program further causes the computer to detect a parameter indicative of at least either the compression ratio or the displacement; and to set the predetermined frequency of the reference signal and the number of predetermined frequencies of the reference signal in accordance with the parameter.

36. An engine control unit according to claim 27, wherein said control program further causes the computer to set the first correlation function to a predetermined value.

37. An engine control unit according to claim 36, wherein said control program further causes the computer to detect an angle position of a crankshaft of the internal combustion engine; and to generate the reference signal on the basis of the angle position of the crankshaft.

38. An engine control unit according to claim 36, wherein said control program further causes the computer to calculate, as the second correlation function, a Fourier coefficient evaluated by developing the in-cylinder pressure change amount data in Fourier series.

39. An engine control unit according to claim 36, the internal combustion engine comprising a variable compression ratio mechanism that changes at least either a compression ratio or a displacement of the internal combustion engine, wherein said control program further causes the computer to detect a parameter indicative of at least either the compression ratio or the displacement; to store a predetermined first correlation function value according to the compression ratio parameter as the predetermined value and to read the first correlation function value according to the detected parameter to set the first correlation function.

* * * * *